Patented Mar. 18, 1952

2,589,567

UNITED STATES PATENT OFFICE 2,589,567

MELAMINE FORMALDEHYDE SCRATCH RESISTANT COATING COMPOSITION, METHOD OF APPLYING, AND ARTICLE PRODUCED THEREBY

Mortimer H. Nickerson, Springfield, Mass., assignor to De Bell & Richardson, Inc., Springfield, Mass., a corporation of Massachusetts No Drawing. Application September 10, 1948, Serial No. 48,773

9 Claims. (Cl. 117—138.8)

This invention relates to an improved scratch resistant plastic and more particularly to a scratch resistant plastic coating applicable to clear transparent plastics such as one of those hereinafter indicated. It further relates to a method of preparing and applying such coatings and the improved scratch resistant plastic thereby obtained.

Plastic materials which are glass-like in optical characteristics have many advantages over glass because of their resiliency and toughness, flexibility and ease of fabrication, but have the disadvantage that they are far more easily scratched than glass and, therefore, have a shorter usable life in cases where optical clarity is essential.

While the invention has a special utility in optical work it is equally applicable to pigmented plastics where a scratch resistant surface is desirable.

The principal object of the invention is to provide a plastic material having improved properties of scratch resistance combined with flexibility, satisfactory for optical purposes and other uses where these properties are desirable.

Other and further objects and advantages residing in the specific combination of materials and the method of producing the materials and achieving their combination will be made apparent in the following specification and claims.

I have found that if 1 mol of melamine is condensed with 4 mols of formaldehyde (contained in 37% aqueous methanol solution) in the presence of normal butanol as a solvent a thin, colorless, transparent, or only slightly hazy solution is obtained. No catalyst is employed and the mixture is merely refluxed for thirty minutes after clearing. When this syrup is applied in a thin coating to a sheet of a plastic such as cellulose acetate, cellulose acetate butyrate, ethyl cellulose, methyl methacrylate, polystyrene or copolymers of vinyl chloride and vinyl acetate, and the coated plastic sheet is subjected to suitable heat and pressure, a hard scratch resistant coating results which is some twenty times more abrasion resistant than the uncoated surface of the base sheet.

The melamine formaldehyde resins which have been used for conventional commercial purposes do not generally exceed a mol ratio of 1:3 for melamine and formaldehyde respectively. Commercially available unfilled melamine formaldehyde resin condensed in the mol ratio of 1:3 as well as laboratory prepared resins of 1:3 ratio when tested did not display the superior abrasion resistance of the 1:4 condensation product. A further increase in the proportion of formaldehyde did not further improve the abrasion resistance and introduced difficulties such as unstability of the resin syrup and difficulty in smooth application of the syrup to the plastic base sheet.

Preferably the normal butanol is introduced in the ratio of approximately 6 mols of the butanol to the 1 mol of melamine and the 4 mols of formaldehyde. The finished surface of the coating is of the same hardness whether butanol is used or not but the ease of application of the coating to the base plastic is improved. The resulting syrup is more amenable to being sprayed on the surface than where no butanol is used.

The coatings produced as above described are satisfactory for purposes where a substantial degree of flexibility is not needed. A .01 inch thick sheet of cellulose acetate coated with a finished coat, as above described, of thickness of the order of .0005 inches will show minute cracks in surface of the coating if bent 180° over a ¾ inch rod. Greater flexibility is needed for many uses. Melamine formaldehyde resins are inherently relatively brittle and many attempts have been made to plasticize them. For the most part such plasticizers have been alkyd-type resins. Such resins tend to produce an objectionable haze, because of incompatibility, which renders the product unsuitable for optical uses. Also the increased flexibility so obtained is secured at the expense of the abrasion resistant properties of the melamine formaldehyde resin which it is the purpose of the present invention to utilize and increase.

An important feature of my invention is the plasticization of melamine formaldehyde resin in a novel manner which not only very substantially increases its flexibility but also increases its resistance to abrasion, as measured by the Taber abraser. I achieve this result by adding to the resin syrup up to 25% (based on the solids content of the syrup) of the salt of an aliphatic straight chain polyamine (including the diamines) and an aliphatic dibasic acid. Those diamines or polyamines which have been found satisfactory have the general formulae:

$$H_2N(CH_2)_x—NH_2$$

or $$H_2N—CH_2(CH_2—NH—CH_2)_yCH_2—NH_2$$

where $x$ may be 2 or any number above 2 and $y$ may be 1 or any number above 1 up to the point where incompatibility causes an unacceptable drop in the clarity or abrasion resistance in the product. Those dibasic acids which have been found satisfactory have the general formula:

$$HOOC-(CH_2)_z-COOH$$

where $z$ may be any number, including zero but other than 1, up to a length where incompatibility causes an unacceptable drop in the clarity or abrasion resistance in the product.

As indicative of the improved flexibility and abrasive resistance thus obtainable a .01 inch thick sheet of cellulose acetate provide as above described with a so-plasticized melamine formaldehyde coating can be bent 180° around a $\frac{3}{16}$ inch diameter rod without crazing or cracking of the surface. The optical clarity of the coating is unimpaired and its abrasion resistance as measured by the Taber abraser is slightly improved over the unplasticized coating. As regards the overall effect of the so-plasticized coating a clear sheet of cellulose acetate coated with the plasticized melamine formaldehyde coating withstood approximately 200 revolutions on the Taber abraser using CS-10 wheels, with a 500 gram load before it showed as much abrasion as did the uncoated sheet after 10 revolutions using the same wheels and load.

The amount of amine salt added may vary between 7% to 33%. Plasticization becomes practically effective at about 7% and at around 33% evidence of incompatability as shown by haze in the coating begins to appear. While little difference in flexibility is noted within the percentages specified, the higher percentages show a greater enhancement of the abrasion resistance.

Plasticization can be accomplished by the addition of the diamines alone in a percentage range of 5-25% based on the solids in the resin syrup. The flexibility thus obtained however is gained at the expense of a decrease in the abrasion resistance, and is accompanied by a pronounced coloration of the coating which is objectionable for most optical purposes. The addition of the diabasic acid alone produces no effect whatever on the flexibility or abrasion resistance of the coating. Only when apolyamine of the classes described above is combined with a diabasic acid, is flexibility gained while retaining, or in some cases, enhancing the abrasion resistance with optical clarity.

For reasons of availability and stability in handling, the preferable polyamines (including diamines) are hexamethylene diamine, decamethylene diamine, diethylene triamine and tetraethylene pentamine; the preferable dibasic acids being oxalic, maleic, succinic, adipic and sebacic. The salt of hexamethylene diamine and maleic acid has been found that the most preferable for the general purposes of the invention.

The novel effect obtained by the combination of polyamines and dibasic acids of the classes described may be due to the condensation of the salt of the diamine and dibasic acid to a polyamide under the conditions which exist during pressing and curing. Polyamides are noted for their toughness and flexibility. If formed under the conditions here present the polyamide may well be compatible with the condensation product of the melamine and formaldehyde, and impart a resilience and flexibility thereto which the melamine formaldehyde customarily lacks, while increasing its abrasive resistance. While the above theory is difficult if not impossible to demonstrate in the laboratory some support is given to it by the fact that I have succeeded in introducing a small amount (up to 5%) of a commercial polyamide (Nylon) into the resin syrup. The resulting coating did possess slightly improved flexibility and abrasion resistance, although the coating was not optically clear, having a marked haze indicative of some incompatability.

An illustrative procedure is as follows:

A resin syrup is prepared by placing together in a suitable flask:

63 grams melamine
    160 grams 37.5% formaldehyde
    200 grams normal butanol

These quantities may be enlarged or decreased in the above proportions using 4 mols of formaldehyde to 1 mol of melamine together with 6.1 mols of normal butanol. The mixture is brought to reflux temperature while stirring and is kept at reflux (about 95° C.) for one-half hour after the time at which the solution becomes clear. The solution is then cooled fairly rapidly to room temperture (65° to 90° F.) to avoid further condensation. The solution at this point is slightly cloudy. On standing for a day or two, a small proportion of aqueous layer will separate as a lower layer. In use, the resin syrup is decanted from this lower layer. The above prepared solution, referred to as the resin syrup, has a low viscosity less than 0.5 poises at room temperature.

The amine salt plasticizer solution is prepared by slurrying or dissolving 1 mol of the dibasic acid in a little water and then adding slowly, with stirring and good cooling, 1 mol of the diamine dissolved in water to make a 60% solution. During the addition of the diamine the pH of the solution is measured continuously with a suitable electric pH meter and addition of the diamine is stopped at the neutral point (pH 7.0). A considerable amount of heat is evolved during the preparation of the amine salt. This heat should be removed effectively so that the temperature of the solution does not rise substantially above room temperature. If this is not done, the solution is likely to develop a pronounced yellow color with subsequent undesirable color appearing in the final coating. The final concentration of the amine salt is adjusted to 40% by weight.

The coating solution is made up by mixing 40 parts resin syrup, 10 parts 40% amine salt solution, 15 parts ethyl alcohol (96.5%). The alcohol is added to improve the compatibility of the resin syrup with the aqueous amine salt. The resulting mixture is stirred briefly to provide a uniform homogenous solution which is clear and colorless. As the resin syrup ages, it may be necessary to warm the mixture slightly or to add a little more ethanol to bring it to the clear, colorless stage.

Within 4 to 5 hours after making the above coating solution, which will be referred to as the coating solution, it should be used, as its stability is not great. The coating solution is then applied to the transparent sheets of plastic such as cellulose acetate, by any one of a number of means which will suffice to lay down a thin layer of the solution on both sides of the plastic sheet. This could be done by dip casting, beneath a doctor blade, roller coating or spraying. I have found the latter method to be preferable and the spraying may be carried out with a conventional paint type sprayer with compressed air. Each side of the plastic sheet may be sprayed in turn, depositing a thin uniform layer of the coating solution. This sheet is then hung to dry at room temperature in a suitable space which provides good circulation of clean (filtered) air. The sheets are dried until they are very slightly tacky to the touch, which requires one-half to three hours under the normal range of humidity and temperatures. Warming of the sheets in circulating air above 90° F. is to be avoided since the drying coat is slowly progressing to the cured stage and any increase in temperature would accelerate this change in an undesirable manner.

After the sheets have dried, they are placed between highly polished mirror finish steel plates of the conventional type used in "press-polishing" of plastics. Using conventional techniques, stacks may be made of alternate sheets and steel plates, containing as many as 10 sheets of plastic per stack. The top and bottom plates are suitably padded with cloth or kraft paper by the usual methods to distribute pressure evenly, and the stack is then placed between the platens of a cold press. The platens of the press are closed and pressure applied up to 400 lbs. per square inch on the coated sheets. At this point, heat is applied to the platens to bring the temperature of the sheets to 260-280° F. and this temperature and this pressure are maintained for a period of 20-40 minutes. While still maintaining pressure, the heat is turned off and the platens are cooled rapidly until the internal temperature of the sheets reaches about 125° F. At this point, pressure is relieved, the platens are opened and the stack is removed from the press. The finished coated sheets are readily removed from between the polishing plates. The above process is described as I have carried it out on production equipment using 20" x 50" or slightly larger plastic sheets and a multiple opening press.

The range of temperature and time of pressing given above is due to the necessarily different treatment given the various plastics as they differ in their tendency to flow under heat and pressure. In order to convert the coating to the hard scratch resistant state, it is necessary to supply heat for a certain length of time. The higher the heat that can be used, the shorter the time may be. The combination of heat and pressure also serves to flatten and make optically correct the base plastic sheet. Too high a heat, however, will cause too great a softening of the base sheet and consequent undesirable flowing under pressure, with rupture and disfigurement of the coatings as the result. It will be seen, therefore, that the maximum temperatures and pressures are fixed by the base sheet, and the maximum temperature, accordingly, fixes the time during which the coated sheet must be heated for proper conversion. With cellulose acetate, at pressures of 400 lbs. per square inch and temperatures of 275-280° F., excessive flow is not encountered and the surfaces harden in 20 minutes at this temperature. Cellulose acetate butyrate, on the other hand, should not be heated in excess of 260-265° F. at 400 lbs. per square inch, since it is a softer resin. Under these conditions, 40 minutes at temperature should be allowed to harden the surface.

It should be recognized that the tendency of the base sheet to flow under various temperatures and pressures depends greatly upon the compounding of the base sheet aside from whether it is cellulose acetate or cellulose acetate butyrate. For example, the amount and type of plasticizer used in compounding the base sheet will exert a considerable effect upon the softness and consequently the above times, temperatures and pressures can only be considered as a general guide.

Since the solvents used in the coating solution do not have any great effect on the above plastics when applied as a spray, the thickness of the base sheet has little effect upon the practicability of applying the coating, although it may vary the drying time—thin sheets drying somewhat more rapidly than the heavier sheets.

In coating ethyl cellulose, the addition of a small amount of hydrogen peroxide to the spraying solution has been found to be advantageous. For some presently unknown reason the surface of the ethyl cellulose seems to catalyze the conversion reaction of the coating at room temperature. As a result, partial conversion sometimes takes place before drying is complete and the material can be pressed. The effect of this partial conversion before pressing is to produce a hazy finished sheet. The addition of 1.5 parts by weight of 30% solution of hydrogen peroxide to the above proportions given for the coating solution, suppresses this partial conversion and prevents haziness in the finished sheet.

The above procedures may be used unchanged for coated copolymer vinyl chloride-vinyl acetate sheets or polystyrene, keeping in mind the maximum temperatures and pressures which can be used as fixed by the tendency towards plastic flow of the base sheet.

The coating may also be applied to sheets of acrylate polymers, such as methyl methacrylate, provided that first the surface of the methyl methacrylate is treated in such a manner that the plasticized coating can bond strongly to it. This can be accomplished by coating the surface of the methyl methacrylate with a thin layer of a copolymer containing some polyacrylic or polymethacrylic acid which has been copolymerized with methyl methacrylate. I have found that a coplymer of 85% methyl methacrylate and 15% methacrylic acid dissolved in suitable solvent, such as acetone, and applied to the methyl methacrylate; the solvent then being evaporated, provides a medium for securely bonding the coating to the base sheet. I believe that it is the presence of the free acidic groups in this copolymer which accomplishes the secure bonding so necessary in this type of coating work. Either acrylic or methacrylic acid may be used, copolymerized with a suitable acrylate ester, such as methyl methacrylate, and the percentage used is not critical provided that it is greater than 15%. Higher percentages of the acid copolymers may however be undesirable because of difficulties in polymerizing or in the physical characteristics of the polymer produced without changing its primary function of securing the bond between the coat and the base sheet. It will be evident that the application of this copolymer primary coating before application of the scratch resistant coating would be unnecessary if the base sheet itself were a copolymer of acrylic or methacrylic acids.

Coatings of the character above described are applicable to a wide range of base plastics where improved surface characteristics of abrasion resistance coupled with resilience or flexibility are desired. While the material has a special application to optical work its use is by no means limited to that field, and for many commercial uses the material may be pigmented to advantage. Neither is its utility limited to the coating of thin soft flexible sheets, since it may be advantageously applied to relatively hard brittle plastic bases to increase the surface resistance of such plastics to crazing under impact.

Further the material may be used for other purposes than that of coating other plastics since it may be used in decorative laminates and the like, and its insolubility in organic solvents makes it useful in a wide range of commercial applications where such property rather than its scratch resistance has importance.

What I claim is:

1. A composition of matter which comprises the admixture of (1) a solution of the chemically unmodified condensation produce of melamine and formaldehyde, the upper limit of the formaldehyde in proportion to the melamine being in the approximate ratio of 4 mols of formaldehyde to 1 mol of melamine, in a solvent consisting essentially of water and butanol, the butanol being present in a predominant amount, and (2) the linear polyamid forming neutral salt of an unsubstituted straight chain polyamine the terminal carbon atoms of which each contain a primary amine and an unsubstituted straight chain aliphatic dibasic acid.

2. A composition of matter as defined in claim 1 in which the linear polyamide forming neutral salt has the general formula:

$$H_2N(CH_2)_x-NH_2$$

and the unsubstituted straight chain dibasic acid has the general formula:

$$HOOC-(CH_2)_z-COOH$$

where $x$ is any number of an integral series starting with 2 and $z$ is any number including zero but other then 1, up to the point of incompatibility of the salt with the resin.

3. A composition of matter as defined in claim 1 in which the linear polyamid forming salt is the neutral salt of hexamethylene diamine and maleic acid.

4. A composition of matter as defined in claim 1 in which the linear polyamid forming salt is the neutral salt of hexamethylene diamine and adipic acid.

5. A composition of matter as defined in claim 1 in which the linear polyamid forming salt is the neutral salt of hexamethylene diamine and sebacic acid.

6. A composition of matter as defined in claim 1 in which the linear polyamid forming salt is the neutral salt of hexamethylene diamine and succinic acid.

7. A composition of matter as defined in claim 1 in which the linear polyamid forming salt is the neutral salt of hexamethylene diamine and oxalic acid.

8. The method of forming a scratch resistant flexible coating on a sheet of synthetic organic thermo-plastic resin which comprises condensing melamine and formaldehyde in the presence of normal butanol, the upper limit of the formaldehyde in proportion to the melamine being in the approximate ratio of 4 mols of formaldehyde to 1 mol of melamine to form a solution of chemically unmodified melamine formaldehyde in a solvent consisting essentially of water and butanol, the butanol being present in a predominant amount, plasticizing the resin by the addition of the linear polyamid forming neutral salt of an unsubstituted straight chain polyamine the terminal carbon atoms of which each contain a primary amine, and an unsubstituted straight chain aliphatic dibasic acid, depositing the mixture on the sheet to a coating of chemically unmodified melamine formaldehyde condensation product thereon, drying the coating at a temperature below 90° F. until it is slightly tacky to the touch, and press polishing the coated sheet, using heat and pressure to cure the coating.

9. A flexible coated sheet of synthetic organic thermo-plastic resin, the coating therein consisting of the composition of claim 1 dried and cured in situ thereon under heat and pressure.

MORTIMER H. NICKERSON.

REFERENCES CITED

The following references are of record in the file of this patent:

UNITED STATES PATENTS

| Number | Name | Date |
| --- | --- | --- |
| 2,223,327 | Light | Nov. 26, 1940 |
| 2,332,958 | West | Oct. 26, 1943 |
| 2,343,230 | Swain | Feb. 29, 1944 |
| 2,397,242 | Chubb | Mar. 26, 1946 |
| 2,402,032 | Fischer | June 11, 1946 |
| 2,413,697 | Edgar | Jan. 7, 1947 |
| 2,437,799 | Yorke | Mar. 16, 1948 |
| 2,466,744 | Scott | Apr. 12, 1949 |